March 19, 1935.  C. J. GOGUEN  1,995,207
BATTERY GAUGE
Filed Nov. 2, 1931
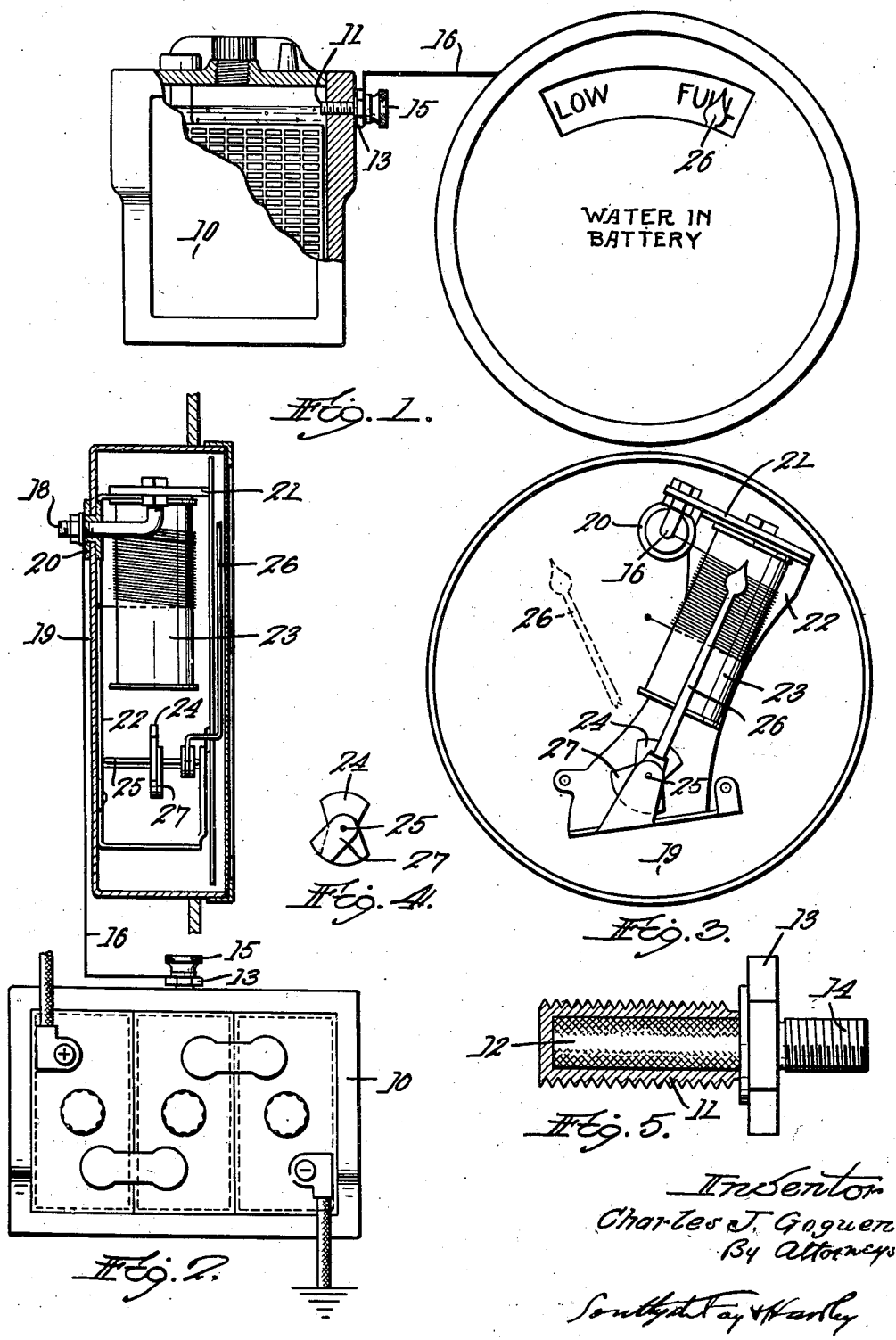

Patented Mar. 19, 1935

1,995,207

UNITED STATES PATENT OFFICE 1,995,207

BATTERY GAUGE

Charles J. Goguen, Flint, Mich.

Application November 2, 1931, Serial No. 572,553

1 Claim. (Cl. 177—329)

This invention relates to a gauge for showing whether the liquid in a battery is below the top of the plates and is particularly adapted for use in connection with automobile storage batteries.

The principal objects of the invention are to provide a connection for conducting the current to the gauge when the battery is full and which is not located in the cap and is not provided with any switch. Also to eliminate all wires from the top of the battery whereby the refilling of the cells can be accomplished without interference with the wires.

Other objects and advantages of the invention will appear hereinafter.

Reference is to be had to the accompanying drawing, in which

Fig. 1 is a front view of a battery and gauge constructed in accordance with this invention showing part of the battery in section;

Fig. 2 is a sectional view of the gauge connected with the battery which is shown in plan;

Fig. 3 is a front view of the gauge with the front plate removed;

Fig. 4 is a view of the weight for the pointer shown in a different position, and Fig. 5 is a diametrical sectional view of the terminal which conducts the current from the liquid in the cell to the gauge.

An important feature of this invention is the fact that only the central cell of a three-cell battery is gauged, thus eliminating the use of switches. The battery 10 is shown as having three cells connected in the usual way and the top is of the usual construction. By this invention no wires or other electrical devices are located on the top of the battery or project down through the top of any of the cells thereof.

In the central cell of the battery at the side is introduced a terminal 11. This is screw-threaded outside and the screw-threaded exterior is made of hard lead so that it can be screwed through a previously threaded hole and will not be injured by the acids of the battery. Inside it is provided with a brass knurled core 12 on which the lead is cast and securely held. It is provided with an integral collar 13 to come up against the casing of the battery outside and with a screw-threaded end 14. A thumb nut 15 is located on the screw-thread to secure the terminal of the wire 16 which goes to the gauge.

The wire 16 is connected with a screw-threaded rod 18 which is set into the back of the gauge casing 19 with a double insulating washer 20. This rod is bent upwardly and secured to an insulator 21 in the casing. This insulator 21 is supported on a frame 22 which is fixed in stationary position and it also carries a coil 23 on a core. The wire 16 is connected through the rod 18 with one end of the coil. The other end of the coil is grounded on the frame 19 which is metallic. The negative pole of the battery is also grounded, making the circuit complete through the liquid in the central cell, the end cell serving as the source of power.

The effect of connecting up the circuit and having the liquid reach the screw 11, as indicated in Fig. 1, is to energize the coil 23 which operates on an armature 24 pivoted at 25 on a bracket carried by the frame 22. Fixed with respect to this armature 24 is a pointer 26 and a counterweight 27 is provided to bring the pointer up to the dotted line position in Fig. 3 when the coil 23 is not energized.

It will be seen therefore that the operation is very simple. Whenever the liquid is high enough, the pointer shown through the opening in the gauge indicates that the battery is full. When the liquid gets below the screw 11 the circuit is broken through the liquid and the pointer is no longer attracted by the electro-magnet but is moved back to the dotted line position in Fig. 3 by the counterweight 27. Thus the pointer indicates "low" on the gauge.

This works entirely automatically and it requires no switch, no wires are provided at the top of the battery to interfere with the filling or possibly short-circuit it and nothing has to be set after the device operates. It indicates only the liquid in the central cell of the battery but it is not necessary ordinarily to show anything further than this. However, if desired, a duplicate device can be employed to show the height of liquid in other cells.

This terminal 11 is permanent and screws into the battery case at a fixed level from the plates, allowing sufficient electrolyte when the gauge registers "low". It does not have to be removed, as its outer layer is of a material not affected by the battery acids. Of course, it is suitable for use for all kinds of wet batteries. When used for an automobile battery, the gauge can be located on the instrument panel or the front dash.

Although I have illustrated and described only a single form of the invention, I am aware of the fact that modifications can be made therein by any person skilled in the art without departing from the scope of the invention as expressed in the claim. Therefore, I do not wish to be limited to all the details of construction herein shown and described, but what I do claim is:—

A battery gauge comprising a casing, a coil in said casing, means supporting said coil in said casing so that its axis will be at an inclination from the vertical when the gauge is properly positioned for use, a shaft, means pivoting said shaft adjacent the end of said coil, a pointer on said shaft, an armature on said shaft, means including said armature and pointer for causing the armature to be normally spaced away from the end of the coil, and a dial cooperating with the pointer for showing the position of the latter in the energized or deenergized condition of the coil.

CHARLES J. GOGUEN.